United States Patent [19]
Ohta

[11] Patent Number: 5,308,032
[45] Date of Patent: May 3, 1994

[54] KNUCKLE BRACKET

[75] Inventor: Akihisa Ohta, Gifu, Japan

[73] Assignee: Kayaba Kogyo Kabuschiki Kaisha, Tokyo, Japan

[21] Appl. No.: 966,944

[22] Filed: Oct. 27, 1992

Related U.S. Application Data

[62] Division of Ser. No. 741,144, Aug. 7, 1991, Pat. No. 5,170,973.

[51] Int. Cl.$^5$ ............................................. B60G 15/06
[52] U.S. Cl. .................................... 248/230; 248/916; 280/668
[58] Field of Search ................. 248/230, 916; 280/668, 280/96.1, 661

[56] References Cited

U.S. PATENT DOCUMENTS

| | | | |
|---|---|---|---|
| 4,194,760 | 3/1980 | Shiomi et al. | 280/661 |
| 4,491,339 | 1/1985 | Mizumukai et al. | 280/668 |
| 4,618,162 | 10/1986 | Specktor et al. | 280/661 |
| 4,948,160 | 8/1990 | Barry | 280/668 X |

Primary Examiner—Alvin C. Chin-Shue
Attorney, Agent, or Firm—McGlew and Tuttle

[57] ABSTRACT

The present invention relates to a knuckle bracket for use in mounting a vehicular shock absorber. The knuckle bracket has an outer bracket and an inner bracket, the outer bracket comprising an annular portion and a pair of clamp portions extending in parallel from the annular portion, the inner bracket comprising a bent backrest portion and a pair of support pieces extending in parallel from the backrest portion. The support pieces of the inner bracket are inserted between the clamp portions of the outer bracket, and a reinforcing bracket is provided at least between the support pieces of the inner bracket to prevent deformation, tilting and disengagement of the knuckle bracket.

5 Claims, 5 Drawing Sheets

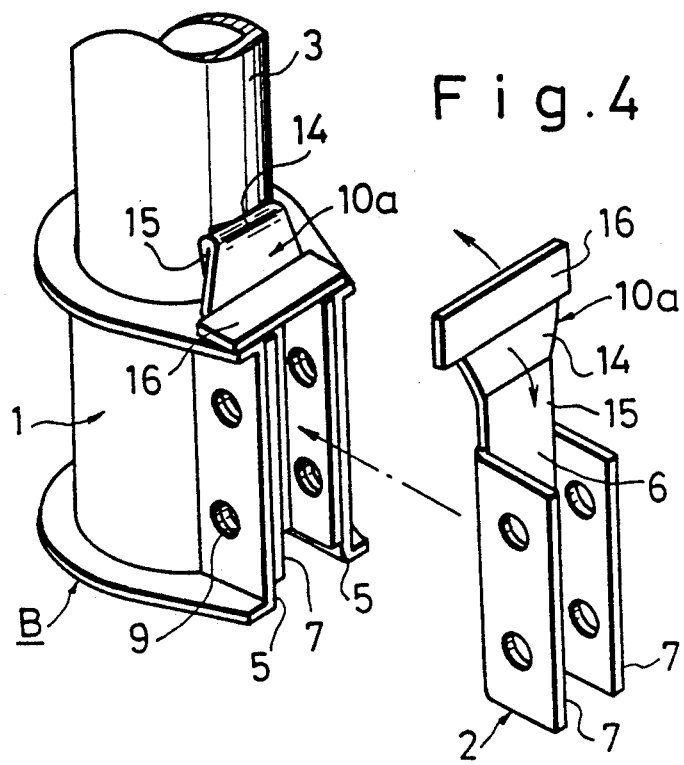
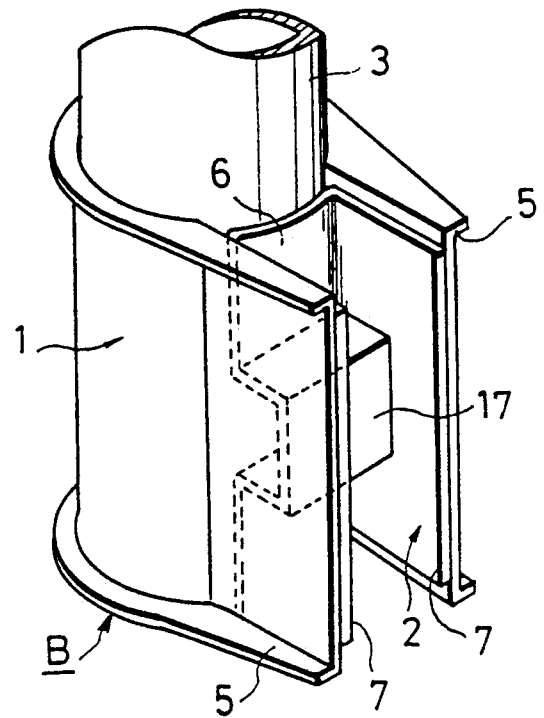

KNUCKLE BRACKET

This is a divisional of application Ser. No. 07/741,144 filed Aug. 7, 1991, U.S. Pat. No. 5,170,973, issued Dec. 15, 1992.

FIELD OF THE INVENTION

The present invention relates to a knuckle bracket for use in mounting a strut type shock absorber which is disposed between a vehicle body side and a wheel side of a vehicle to suspend the vehicle body and absorb energy such as vibration from the road surface.

BACKGROUND OF THE INVENTION

A strut Type shock absorber comprises an outer shell and a shock absorber inserted into the outer shell. A lower portion of the outer shell is mounted near the wheel side of a vehicle while being supported by a knuckle bracket.

There are known knuckle brackets of this type for example, those disclosed in Japanese Utility Model Publication No. 13790/86, U.S. Pat. No. 4,491,339 and Japanese Patent Laid Open No. 160442/81, and the structure shown in FIG. 10 attached hereto has been adopted as a typical structure.

The knuckle bracket illustrated in the same figure and indicated at A is composed of an outer bracket 1 and an inner bracket 2. The outer bracket 1 comprises an annular portion 4 which encloses an outer shell 3 therein and a pair of clamp portions 5, 5 extending in parallel from the annular portion 4. The inner bracket 2 comprises a bent backrest portion 6 which is in abutment with the outer shell 3 and a pair of support pieces 7, 7 extending in parallel from the backrest portion 6.

A lower portion of the outer shell 3 with a shock absorber 8 inserted therein is enclosed in the annular portion 4 of the outer bracket 1, and the support pieces 7, 7 of the inner bracket 2 are clamped by the clamp portions 5, 5 of the outer bracket 1 while the backrest portion 6 of the inner bracket 2 is kept in abutment with the outer shell 3. The clamp portions 5 and the support pieces 7 are clamped together with bolts inserted into bolt holes 9.

However, when a shock input from the road surface is large, a bending load acting in a lateral direction X—X or a transverse direction Y—Y in FIG. 10 is imposed on the outer shell 3 or the knuckle bracket A. In the case of a lateral load, the clamp portions 5, 5 and the support pieces 7, 7 of the knuckle bracket A may become opened and deformed; as a result, there is a fear of the knuckle bracket A tilting or coming off the outer shell 3.

SUMMARY OF THE INVENTION

Accordingly, it is the object of the present invention to provide a knuckle bracket capable of fully bearing lateral and transverse loads even when such loads are imposed on a member to be mounted and thereby capable of preventing lateral opening, deformation and tilting.

According to the present invention, in order to achieve the above-mentioned object, in a knuckle bracket having an outer bracket and an inner bracket, the outer bracket comprising an annular portion and a pair of clamp portions extending substantially in parallel from the annular portion, the inner bracket comprising a bent backrest portion and a pair of support pieces extending in parallel from the backrest portion, with a cylindrical member to be mounted being inserted into the annular portion of the outer bracket, wherein the support pieces of the inner bracket are inserted and clamped between the clamp portions of the outer bracket while the backrest portion of the inner bracket is kept in abutment with the cylindrical member, there is provided an improvement characterized in that a reinforcing bracket is provided at least between the support pieces of the inner bracket.

The reinforcing bracket may use a hollow triangular prism formed by bending a plate and comprising horizontal, vertical and inclined portions; a hollow triangular or square pole-like pipe; a reinforcing bracket formed by bulging a middle part of the backrest portion of the inner bracket toward the spacing between the support pieces of the inner bracket; or a laterally extending cutout piece formed by cutting out a body part of one clamp portion of the outer bracket and bending the resulting cutout piece laterally.

The following function can be attained by the above construction. When a transverse load is exerted on the cylindrical member, the front and rear outer peripheral portions of the cylindrical member are supported by both the annular portion of the outer bracket and the backrest portion of the inner bracket. When a lateral load is imposed on the cylindrical member, the annular portion of the outer bracket supports the outer peripheral side faces of the cylindrical member. At this time, the support pieces of the inner bracket are prevented from being opened in the lateral direction by means of the reinforcing bracket provided between those support pieces.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIGS. 3 and 4 are perspective views of a knuckle bracket according to another embodiment of the present invention;

FIG. 5 is a perspective view of a knuckle bracket according to a further embodiment of the present invention;

DETAILED DESCRIPTION OF THE PREFERRED EMBODIMENTS

Embodiments of the present invention will be described in detail hereinunder with reference to the accompanying drawings.

Figure 1:
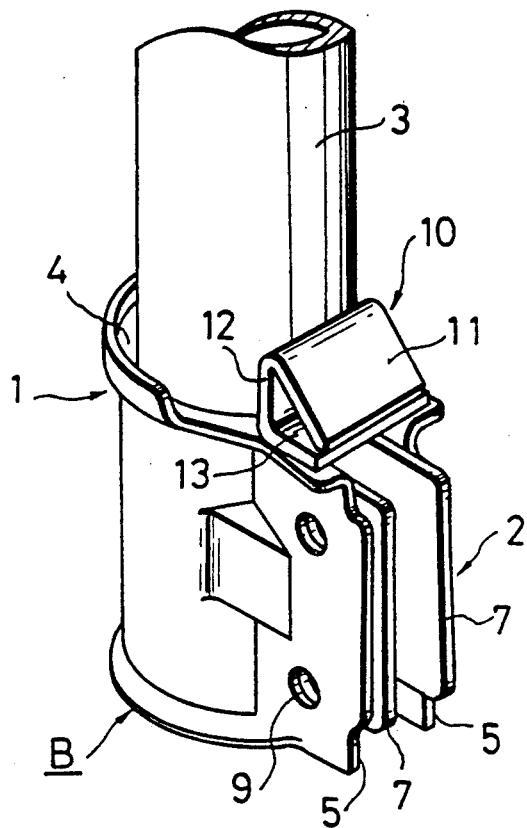
FIG. 1 is a perspective view of a knuckle bracket according to an embodiment of the present invention.
Figure 2:
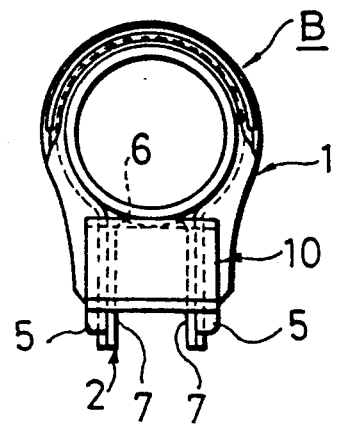
FIG. 2 is a plan view thereof.
Figure 10:
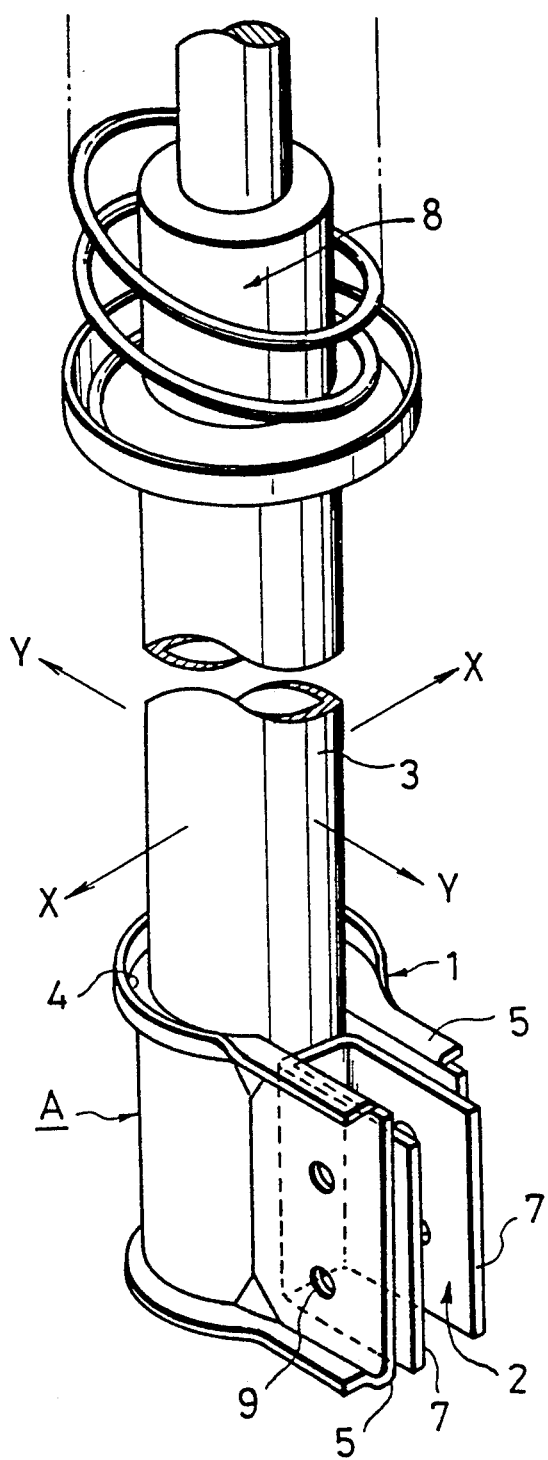
FIG. 10 is a perspective view of a conventional knuckle bracket.

FIGS. 1 and 2 illustrate an embodiment of the present invention. A basic construction of a knuckle bracket B according to this embodiment is the same as in the prior art illustrated in FIG. 10. The knuckle bracket B comprises an outer bracket 1 and an inner bracket 2. The outer bracket 1 comprises an annular portion 4 serving as a socket for a cylindrical member to be mounted, and a pair of clamp portions 5, 5 extending substantially in parallel from the annular portion 4, while the inner bracket 2 comprises a bent backrest portion 6 and a pair of support pieces 7, 7 extending substantially in parallel from the backrest portion 6.

Into the annular portion 4 of the outer bracket 1 is inserted a lower portion of an outer shell 3 of a strut type shock absorber as a member to be mounted, and the backrest 6 of the inner bracket 2 is in abutment with the front-side outer periphery of the outer shell 3.

The clamp portions 5, 5 of the outer bracket 1 and the support pieces 7, 7 of the inner bracket 2 interposed between the clamp portions are clamped together with bolts inserted into bolt holes 9.

A reinforcing bracket 10 is formed in the shape of a hollow triangular prism consisting of a horizontal portion 13, a vertical portion 12 and an inclined portion 11 by bending a plate. The lower surface of the horizontal portion 13 is mounted bridgewise on the upper ends of the clamp portions 5, 5, and are the of the support pieces 7, 7 are welded thereto, while the back of the vertical portion 12 is brought into abutment with the outer surface of the outer shell 3 and is welded thereto if necessary.

Since the reinforcing the area bracket 10 reinforces between the two clamp portions 5, 5 and also between the two support pieces 7, 7, even when a lateral load is imposed on the outer shell 3, the clamp portions 5, 5, and the support pieces 7, 7 are prevented from being opened in cooperation with the bolts. Further, when a transverse load is applied to the outer shell 3, since the outer shell is supported not only by the annular portion 4 and the backrest portion 6 but also by the vertical portion 12, its tilting is prevented and a bending moment induced in the outer shell 3 is reduced.

Referring now to FIGS. 3 and 4, there is illustrated a knuckle bracket according to another embodiment of the present invention, in which a reinforcing bracket is formed integrally with an inner bracket.

A basic form of an outer bracket 1 and that of an inner bracket 2 are the same as in the embodiment shown in FIG. 1. A plate is provided integrally with an upper end of a backrest portion 6 of the inner bracket 2 and it is bent to form a horizontal portion 16, a vertical portion 14 and an inclined portion 11. The horizontal portion 16 is mounted bridgewise on the upper ends of clamp portions 5, 5 and of support pieces 7, 7 and welded thereto, while the back of the vertical portion 15 is brought into abutment with the outer surface of the outer shell 3. In cooperation with tightening of bolts, the horizontal portion 16 reinforces the clamp portions 5, 5, and the support pieces 7, 7 to prevent opening thereof.

Referring now to FIG. 5, there is illustrated a knuckle bracket according to a further embodiment of the present invention, in which a reinforcing bracket is provided integrally with a backrest portion of an inner bracket. A basic form of an outer bracket 1 and that of an inner bracket 2 are the same as in the embodiment shown in FIG. 1.

A reinforcing bracket 17 is formed by bending an intermediate part of a backrest portion 6 of the inner bracket 2 so as to bulge to the front side, and both side faces of the reinforcing bracket 17 are welded to inner surfaces of support pieces 7, 7. The reinforcing bracket 17, in cooperation with bolts, or alone, prevents the support pieces 7, 7 from being opened.

Figure 6:
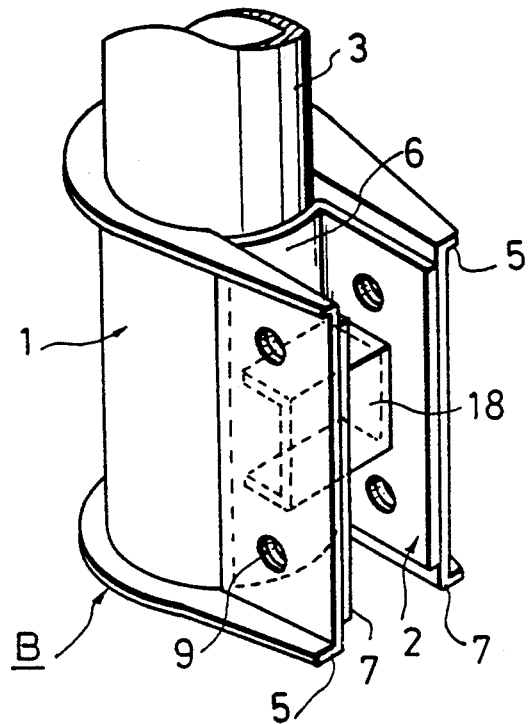
FIG. 6 is a perspective of a knuckle bracket according to a still further embodiment of the present invention.

Referring now to FIG. 6, there is illustrated a knuckle bracket according to a still further embodiment of the present invention, in which a reinforcing bracket improved over that shown in FIG. 5 is used. More specifically, both end faces of a reinforcing bracket 18 which is bent centrally are welded to both end faces of support pieces 7, 7 to prevent opening of the support pieces.

Figure 7:
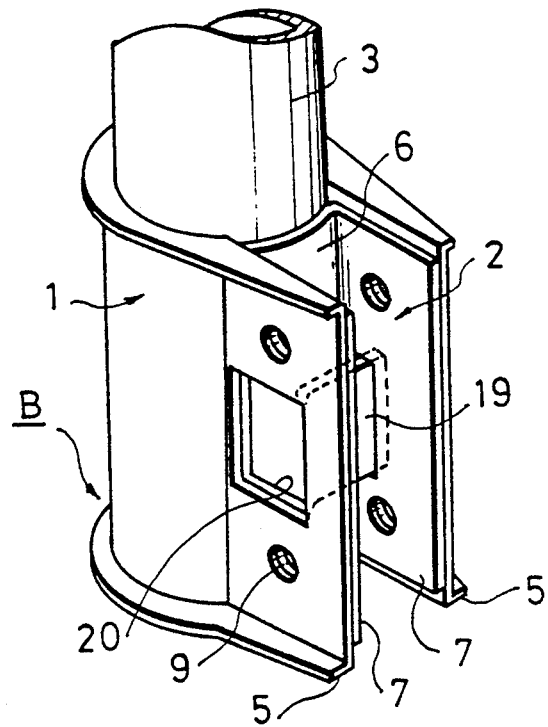
FIG. 7 is a perspective view of a knuckle bracket according to a still further embodiment of the present invention.

Referring now to FIG. 7, there is illustrated a knuckle bracket according to a still further embodiment of the present invention, in which a middle part of one clamp portion 5 of an outer bracket 1 is cut out to form a cutout piece and this cutout piece is utilized as a reinforcing bracket 19. The reinforcing bracket 19 is bent laterally through an opening 20 of one support piece 7 and an end portion thereof is welded to an inner surface of the other support piece 7. Even when a lateral load is imposed on the support pieces 7, 7, the reinforcing bracket prevents the support pieces from being opened in that lateral direction, in cooperation with bolts or alone. Also in this embodiment, a basic form of the outer bracket 1 and that of an inner bracket 2 are the same as in the embodiment shown in FIG. 1.

Figure 8:
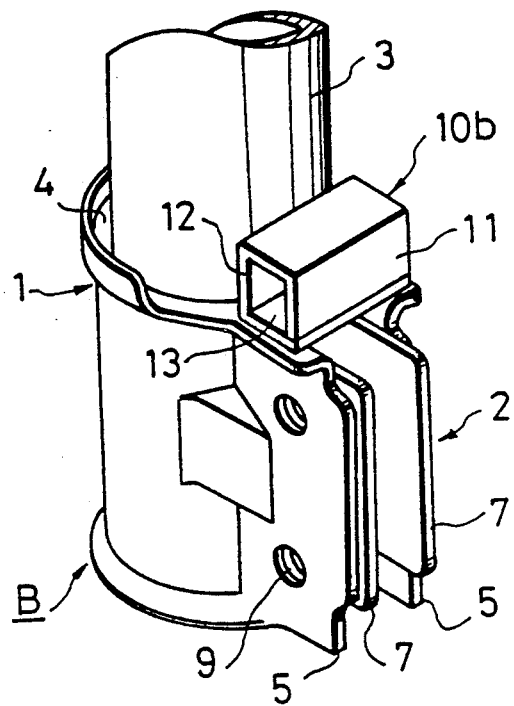
FIG. 8 is a perspective view of a knuckle bracket according to a still further embodiment of the present invention.

Referring now to FIG. 8, there is illustrated a knuckle bracket according to a still further embodiment of the present invention, in which, in place of the reinforcing bracket 10 shown in FIG. 1, a reinforcing bracket 10b constituted by a hollow square pole-like pipe is welded to upper surfaces of clamp portion 5 of an outer bracket 1 and also to upper ends 7 of an inner bracket 2. In place of such square pole-like pipe there may be used a triangular or polygonal pipe, or there may be used a solid polygonal pole.

Figure 9:
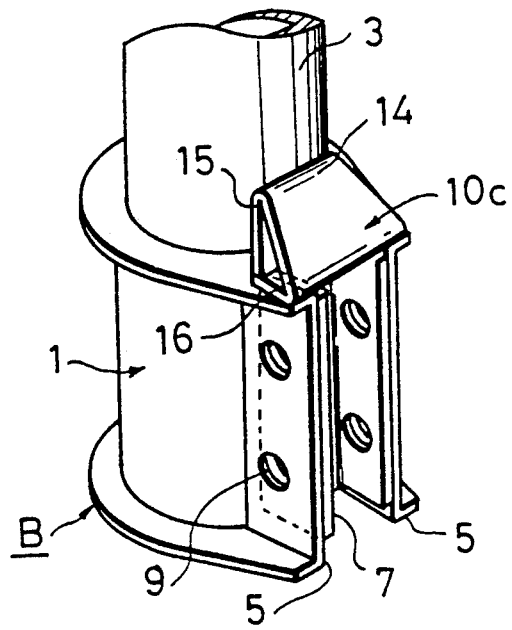
FIG. 9 is a perspective view of a knuckle bracket according to a still further embodiment of the present invention.

Referring now to FIG. 9, there is illustrated a knuckle bracket according to a still further embodiment of the present invention, in which there is used a reinforcing bracket as a modification of the reinforcing bracket 10a shown in FIG. 3. This reinforcing bracket, indicated at 10c, is formed in the shape of a hollow triangle comprising a vertical portion 14a, an inclined portion 11a and an inwardly bent horizontal portion 16a. The function and effect are the same as in the embodiment shown in FIG. 3.

The following effects are attained by the present invention.

①  Since a reinforcing bracket is mounted at least between a pair of support pieces of an inner bracket, even when a lateral load is imposed on the support pieces from a cylindrical member to be mounted, the reinforcing bracket bears the load and prevents the support pieces from being opened, whereby the deformation, tilting and disengagement of the knuckle bracket are prevented.

②  In the case of a reinforcing bracket having a vertical portion which comes into abutment with an outer surface of a cylindrical member to be mounted, it is possible to bear even a load from the front side of the cylindrical member.

(3) Since a basic form of an outer bracket and that of an inner bracket are the same as in the prior art and what is required is a mere addition thereto of a reinforcing bracket of a simple structure, the processability is good and an advantage is attained in point of cost.

(4) Usually, a measure against deformation is to increase the wall thickness of the bracket and the outer shell, while in the present invention it is not necessary to increase the wall thickness of the entire bracket and outer shell, so it is possible to attain the reduction of weight. Conversely, in the present invention, the provision of a reinforcing bracket permits the decrease in wall thickness of conventional outer shell and bracket, whereby the reduction of weight can be attained.

While specific embodiments of the invention have been shown and described in detail to illustrate the application of the principles of the invention, it will be understood that the invention may be embodied otherwise without departing from such principles.

What is claimed is:

1. A knuckle bracket for holding a cylindrical member, the bracket comprising:

an outer bracket having an annular portion and a pair of clamp portions extending substantially in parallel from said annular portion, said annular portion receiving and surrounding the cylindrical member; and an inner bracket positionable between said clamp portions of said outer bracket, said inner bracket having a bent backrest portion positioned against the cylindrical member and a pair of support pieces extending substantially in parallel from said backrest, said support pieces being positioned and clampable between said clamp portions of said outer bracket, said inner bracket having a reinforcing bracket means for retaining said clamp portions and said support pieces in a closed position during lateral loads on the cylindrical member, said reinforcing bracket means having a wall structure extending between said support pieces and in a plane substantially parallel to an axial axis of the cylindrical member and spaced from said cylinder member, positioned substantially centrally between upper and lower edges of said support pieces.

2. A bracket in accordance with claim 1, wherein:
said support pieces have a side substantially opposite said backrest; and
said wall structure is positioned in between said side of said support pieces and said backrest, said wall structure also being spaced from said side of said support pieces and spaced from the cylindrical member, said support pieces having bolt holes above and below said wall structure.

3. A knuckle bracket for holding a cylindrical member, the bracket comprising:

an outer bracket having an annular portion and a pair of clamp portions extending substantially in parallel from said annular portion, said annular portion receiving and surrounding the cylindrical member; and an inner bracket positionable between said clamp portions of said outer bracket, said inner bracket having a bent backrest portion positioned against the cylindrical member and a pair of support pieces extending substantially in parallel from said backrest, said support pieces being positioned and clampable between said clamp portions of said outer bracket, said inner bracket having a reinforcing bracket means for retaining said clamp portions and said support pieces in a closed position during lateral loads on the cylindrical member, said reinforcing bracket means having a wall structure extending between said support pieces and in a plane substantially parallel to an axial axis of the cylindrical member, said wall structure being provided as a middle part of said backrest bulging away from said cylindrical member and towards a space between said support pieces.

4. A knuckle bracket for holding a cylindrical member, the bracket comprising:

an outer bracket having an annular portion and a pair of clamp portions extending substantially in parallel from said annular portion, said annular portion receiving and surrounding the cylindrical member; and an inner bracket positionable between said clamp portions of said outer bracket, said inner bracket having a bent backrest portion positioned against the cylindrical member and a pair of support pieces extending substantially in parallel from said backrest, said support pieces being positioned and clampable between said clamp portions of said outer bracket, said inner bracket having a reinforcing bracket means for retaining said clamp portions and said support pieces in a closed position during lateral loads on the cylindrical member, said reinforcing bracket means having a wall structure extending between said support pieces and in a plane substantially parallel to an axial axis of the cylindrical member, said wall structure being provided as a cut-out piece cut out from a portion of one of said clamp portions of said outer bracket, said cut-out piece extending laterally through a cut-out opening formed in one of said support pieces of said inner bracket.

5. A knuckle bracket for holding a cylindrical member, the bracket comprising:

an outer bracket having an annular portion and a pair of clamp portions extending substantially in parallel from said annular portion, said annular portion receiving and surrounding the cylindrical member; and an inner bracket positionable between said clamp portions of said outer bracket, said inner bracket having a bent backrest portion positioned against the cylindrical member and a pair of support pieces extending substantially in parallel from said backrest, said support pieces being positioned and clampable between said clamp portions of said outer bracket, said inner bracket having a reinforcing bracket means for retaining said clamp portions and said support pieces in a closed position during lateral loads on the cylindrical member, said reinforcing bracket means having a wall structure extending between said support pieces and in a plane substantially parallel to an axial axis of the cylindrical member, said reinforcing bracket means including two additional wall structures combined with said wall structure to form a substantially U-shaped bracket, said two additional wall structures being substantially perpendicular to said wall structure.

* * * * *